US011092451B2

(12) United States Patent
Basir et al.

(10) Patent No.: US 11,092,451 B2
(45) Date of Patent: Aug. 17, 2021

(54) SELECTIVE VEHICLE TRACKING AND VEHICLE ROUTING

(75) Inventors: Otman A. Basir, Waterloo (CA); William Ben Miners, Guelph (CA)

(73) Assignee: Appy Risk Technologies Limited, Cheshire (GB)

(*) Notice: Subject to any disclaimer, the term of this patent is extended or adjusted under 35 U.S.C. 154(b) by 745 days.

(21) Appl. No.: 13/559,930

(22) Filed: Jul. 27, 2012

(65) Prior Publication Data
US 2013/0030605 A1    Jan. 31, 2013

Related U.S. Application Data

(60) Provisional application No. 61/512,035, filed on Jul. 27, 2011, provisional application No. 61/560,129, filed on Nov. 15, 2011.

(51) Int. Cl.
*G01C 21/34*    (2006.01)
(52) U.S. Cl.
CPC ..... *G01C 21/3461* (2013.01); *G01C 21/3469* (2013.01)
(58) Field of Classification Search
CPC .. G01C 21/3446; G07C 5/008; G07C 5/0841; G07C 5/0858; G07C 5/02; G07C 5/00; G06Q 40/08; G08G 1/205; G08G 1/207
USPC .......... 701/1, 207, 213, 32.3, 408, 424, 425, 701/31.4, 457, 29.3, 517, 519, 522; 340/995.19, 995.16, 995.28; 705/4, 14.1, 705/14.64, 14.73; 709/203, 218, 224, 709/225; 903/903; 707/999.003, 999.005
See application file for complete search history.

(56) References Cited

U.S. PATENT DOCUMENTS

| | | | |
|---|---|---|---|
| 6,512,466 B2 | 1/2003 | Flick | |
| 6,711,474 B1 | 3/2004 | Treyz et al. | |
| 7,639,131 B2 | 12/2009 | Mock et al. | |
| 7,788,026 B2 | 8/2010 | Mueller | |
| 2002/0107833 A1 | 8/2002 | Kerkinni | |
| 2003/0009277 A1* | 1/2003 | Fan et al. ...................... | 701/117 |
| 2003/0135486 A1* | 7/2003 | Edlund et al. ................... | 707/3 |
| 2004/0233069 A1* | 11/2004 | Warrior et al. ............ | 340/995.1 |
| 2008/0200192 A1* | 8/2008 | Harris ........................... | 455/466 |
| 2009/0325596 A1* | 12/2009 | Oesterling et al. ........ | 455/456.1 |
| 2010/0049397 A1 | 2/2010 | Liu et al. | |

(Continued)

FOREIGN PATENT DOCUMENTS

| CA | 2 719 025 | 4/2011 |
|---|---|---|
| WO | 2010 081836 | 7/2010 |

OTHER PUBLICATIONS

International Search Report for PCT Application No. PCT/CA2012/000703, dated Nov. 1, 2012.

*Primary Examiner* — Rodney A Butler
(74) *Attorney, Agent, or Firm* — Carlson, Gaskey & Olds, P.C.

(57) ABSTRACT

A vehicle monitoring system permits a user to designate some usage as personal, such that the location of the vehicle is not tracked (or not recorded or not reported). The user can designate the usage as personal in terms of time of day or day of the week or in terms of geographic areas. Optionally, in calculating a route, the system may take into account a safety index; i.e. which route is safer. The system may also take into account which route will consume less energy, particularly where the vehicle is an electric vehicle, which has different efficiencies in certain types of road conditions.

15 Claims, 4 Drawing Sheets

(56) References Cited

U.S. PATENT DOCUMENTS

| | | |
|---|---|---|
| 2011/0238457 A1 | 9/2011 | Mason et al. |
| 2011/0307166 A1 | 12/2011 | Hiestermann et al. |
| 2012/0109692 A1* | 5/2012 | Collins et al. .................... 705/4 |
| 2013/0013348 A1* | 1/2013 | Ling et al. ........................ 705/4 |

* cited by examiner

USER PROFILE – Jane Smith

Do not track my location:

During these times:

Between: __6__ [AM]/PM and __8__ [AM]/PM [Daily]/Weekdays/Weekends or

Between: __6__ [AM]/PM and __11__ AM /[PM] Daily /Weekdays/[Weekends]

Or in these geographic areas:

Zip code: __88888__ or

City: _____ or

Within _____ miles of this address _____ (residence)

FIG.2

USER PROFILE – Jane Smith

Energy consumption categories:

Business/Personal energy consumption under any of these conditions:

During these times:

Between: ____ AM/PM and ____ AM/PM Daily/Weekdays/Weekends or

Between: ____ AM/PM and ____ AM/PM Daily/Weekdays/Weekends

Or in these geographic areas:

Zip code: ____ or

City: ____ or

Within ____ miles of this address ____

FIG.3

SELECTIVE VEHICLE TRACKING AND VEHICLE ROUTING

This application claims priority to U.S. Provisional Application Ser. Nos. 61/512,035, filed Jul. 27, 2011 and 61/560,129, filed Nov. 15, 2011.

BACKGROUND

Existing vehicle monitoring systems may monitor vehicle location as well as driver behavior for various reasons, such as insurance rates, fleet monitoring, and parental supervision. The monitoring can be balanced against privacy concerns for the driver.

In another context, navigation systems that calculate a route along roads in a road database from an origin (typically a current location) to a desired destination are well-known. The route may be selected to provide a lowest cost in terms of time or distance or some combination of the two.

SUMMARY

The present invention provides a vehicle monitoring system in which a user can designate some usage as personal, such that the location of the vehicle is not tracked (or not recorded or not reported). The user can designate the usage as personal in terms of time of day or day of the week or in terms of geographic areas. Optionally, even if the location of the vehicle is not tracked, the driver behavior may still be tracked and the distance driven may still be tracked.

In another context, in calculating a route, the system may take into account one or more new considerations. First, the system may take into account a safety index; i.e. which route is safer. Second, the system may take into account which route will consume less energy, particularly where the vehicle is an electric vehicle, which has different efficiencies in certain types of road conditions.

BRIEF DESCRIPTION OF THE DRAWINGS

FIG. 2 shows one possible screen to permit a user to designate times and geographic areas where location will not be tracked.

FIG. 3 shows one possible screen to permit a user to designate times and geographic areas that are business or personal usage.

DETAILED DESCRIPTION

Figure 1:
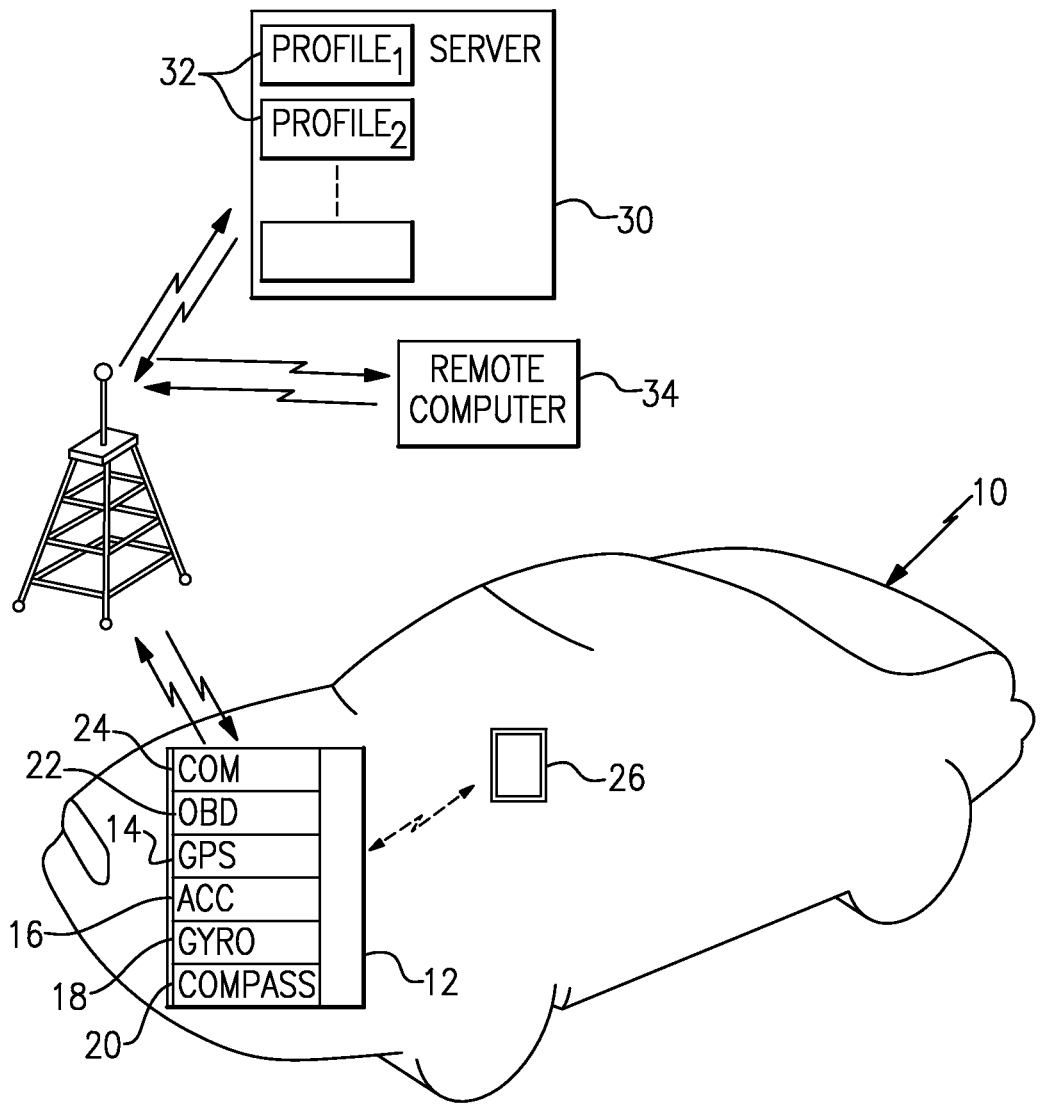
FIG. 1 is a schematic of a vehicle monitoring system according to one embodiment.

Referring to FIG. 1, a motor vehicle 10 includes a plurality of data gathering devices that communicate information to a device 12 installed within the vehicle 10. The example data gathering devices include a global positioning satellite (GPS) receiver 14, an accelerometer 16, a gyroscope 18 and an electronic compass 20, which could be housed within the device 12 (along with a processor and suitable electronic storage, suitable programming, etc). As appreciated, other data monitoring systems could be utilized within the contemplation of this invention. Data may also be collected from an onboard diagnostic port (OBD) 22 that provides data indicative of vehicle engine operating parameters such as engine speed, temperature and other information that is related to mechanical operation of the vehicle, such as the existing OBD-II standard port on vehicles. Moreover, any other data that is available to the vehicle 10 could also be communicated to the device 12 for gathering and compilation of the operation summaries of interest in categorizing the overall operation of the vehicle 10. Not all of the sensors mentioned here are necessary, however, as they are only listed as examples.

The device 12 may also include a communication module 24 (such as cell phone, satellite, wi-fi, etc.) that provides a connection to a wide-area network (such as the Internet). Alternatively, the communication module 24 may connect to a wide-area network (such as the Internet) via a user's cell phone 26 or other device providing communication.

The in vehicle device 12 gathers data from the various sensors mounted within the vehicle 10 and stores that data. The in vehicle device 12 transmits this data (or summaries thereof) as a transmission signal via the communication module 24 through a wireless network to a server 30. The server 30 utilizes the received data to categorize vehicle operating conditions in order to determine or track vehicle use. This data can be utilized for tracking and determining various parameters such as driver behavior, insurance premiums for the motor vehicle, tracking data utilized to determine proper operation of the vehicle and other information that may provide value such as alerting a maintenance depot or service center when a specific vehicle is in need of such maintenance.

The server includes a plurality of profiles 32, each associated with a vehicle 10 (or alternatively, with a user). Among other things, the profiles 32 each contain information about the vehicle 10 (or user) including some or all of the gathered data (or summaries thereof). Some or all of the data (or summaries thereof) may be accessible to the user via a computer 34 over a wide area network (such as the Internet), such as fuel efficiency, environmental issues, location, maintenance, etc. The user can also customize some aspects of the profile 32.

For example, via the computer 34 (FIG. 1), as shown in FIG. 2, the user can set the profile 32 such that the specific location of the vehicle 10 during certain times of day and/or days of the week is not tracked (or at least not transmitted or reported). The user can specify times of the day and/or days of the week in the time exclusion field 38. For example, if the vehicle 10 is a company vehicle 10 that is also used for personal use, it may be appropriate not to track the specific location of the vehicle 10 during times that the vehicle 10 is being used for personal use (e.g. early mornings and weekends). During these times, although the specific location (e.g. gps location) is either not being reported to the server 30 or not to be recorded by the server 30, other aspects may still be recorded by the server 30, such as fuel and/or electricity consumption, speed, driver behavior (acceleration, speed, etc) and distance driven.

As is also shown in FIG. 2, the system can be programmed such that the non-tracking mode is automatically turned on or turned off based on the vehicle 10 entering a certain geographical area/zone, which the user enters in a geographic exclusion field 40 (zip code, city name or within a radius of a particular location). For example, the non-tracking mode can be turned off when the vehicle 10 enters the driver's residence area (again, designated by zip code, city and/or within a radius of a particular location), and on after it leaves the area designated as the residence area. Alternatively, the system can be programmed such that the vehicle 10 is not tracked (or at least, the location is not recorded or reported) when the vehicle 10 is in the geographic area designated as the user's residence area, but the vehicle is tracked when the vehicle leaves the designated residence area.

Optionally, even when the specific location of the vehicle 10 is not being tracked or recorded, the on-board device 12 may still track the distance driven and/or time spent in certain insurance-risk coded geographic areas. For example, the on-board device 12 may record the amount of time or distance in high-risk areas or low-risk areas, or high-risk vs. low risk roads and other driver behavior, such as hard accelerations.

Alternatively, similar rules can be established for when to track the location of a phone 26 (with on-board gps and/or cell tower triangulation or other location-determining electronics) using the screen of FIG. 2.

In the profile, referring to FIG. 3, the user can also establish rules so that energy (fuel or electricity) consumption tracking is distinguished between personal use and company use (or other categories, which could also be more than two categories). FIG. 3 shows the user profile 32, in which the user can modify the time use field 44 to indicate which times will be personal use (or business use) in terms of time of day, days of the week, etc. The user can also modify a geographic use field 46 so that use (driving) in certain geographic areas is designated as personal use (or business use). Similar rules can be established for phone 26 usage (including data usage), distinguishing between personal and company use (or other categories) using the screen of FIG. 3.

Alternatively, or supplementally, the "personal usage" portion is automatically identified based on historical trends, patterns, and knowledge about vehicle destinations/geographic locations (i.e. office building vs. residential neighborhood) which may be contained in the database of roads. This step avoids the need for the user to manually specify personal usage and helps to ensure the solution is as seamless and "hands-off" as possible. For example, trucks may not be tracked between the time they are at "home" (residential) and the time they return to "work"—all without the need for the user to manually specify the definition of "home" and "work." Thus the system can provide automatic identification (as opposed to "user specified") of personal usage vs. business usage for purposes of either determining whether to track location (as above) and/or for purposes of determining the amount of personal vs. business usage (also as above).

Figure 4:
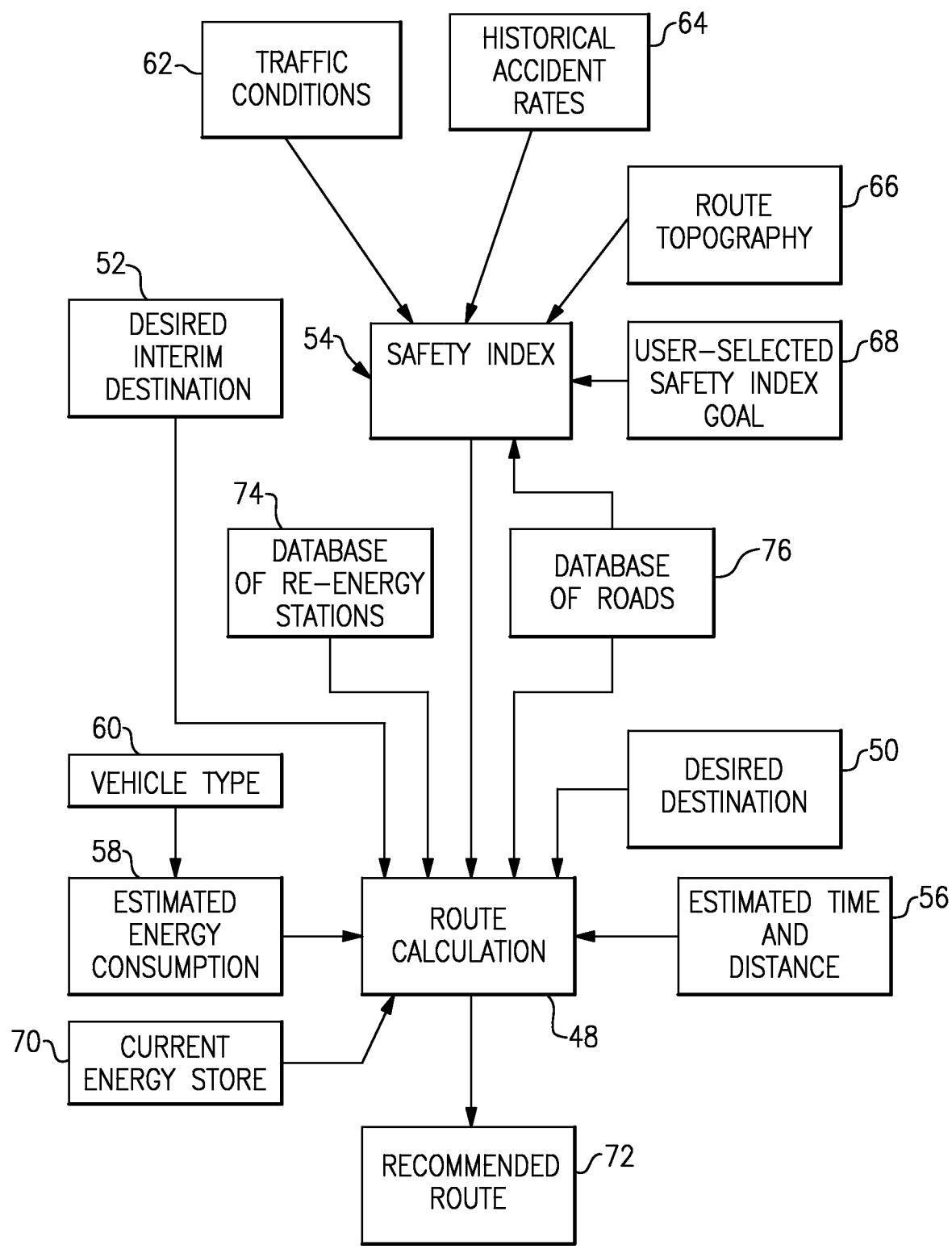
FIG. 4 shows a method for route calculation.

The device 12, phone 26 and/or server 30 (any one of them or in some combination) can calculate a route from a current location to a destination location selected by the user using the method shown in FIG. 4. As is known, the route is calculated in step 48 taking into account different "costs" to arrive at an optimal route based upon a database of roads 76. The costs may include distance and/or time of travel 56, as is known. Additionally, the route is calculated based upon a remaining energy store 70 in the vehicle 10 (e.g. gasoline, propane, natural gas ethanol and/or electricity) to ensure that, if insufficient energy is currently stored, an appropriate type of re-energy station will be reached before the energy store is empty (or within a safety margin). The route is calculated based upon a database of re-energy station locations 74, including the type of energy available and the current price of the energy at each location. The route may be based upon current distance-to-empty, cost of the energy at the possible locations and the size of the required deviation from an otherwise-optimal (e.g. shortest, fastest or safest) route in order to stop at each of the possible re-energy locations. This ensures that the car will not run out of energy, a good price will be obtained but the car will not deviate too much from the otherwise-optimal route.

Optionally, the route can be calculated to include or pass by other points-of-interest along the way to the destination. For example, the user can request the lowest-cost route that passes by a restaurant or a shopping mall.

As another method for calculating a route, the route is calculated to find a lowest cost route, where "cost" is energy consumption 58, taking into account the particular energy consumption characteristics of the particular vehicle type 60. For example, if the vehicle 10 is an electric vehicle 10, a more efficient route will avoid hilly terrain and frequent stops as indicated in the database of roads 76 and certain weather conditions, such as wind or temperature. Energy consumption 58 (again, taking into account the characteristics of the particular vehicle type 60) could be one of many "costs" taken into account in determining the "optimal" route.

As another method for calculating a route, the route is calculated based upon a "safety index" 54 for the trip. A safety index 54 for potential routes is calculated based upon a road characteristics in the road database 76, such as number of lanes, hills, flat, visibility, historical traffic conditions, etc, as well as current traffic conditions 62, historical accident rates 64, route topography 66 (which may be part of the road database 76), etc. The system can give the user a number of routing options from the start to destination based time cost, distance cost, fuel cost and the safety index for each. The user can also specify a safety index goal 68, so that the system will determine routes that meet the safety index goal 68 and selects among those routes based upon other costs (e.g. time, energy consumption, etc).

The system may also consider multiple transportation means for a single trip plan. For example, the system may determine that the user can drive their car to a mid-point where they can take a train, bus or plane to accomplish a specific cost for the trip. The user can conduct what-if scenarios to consider range of options. Based upon all of these criteria and information, the route calculation 48 produces one or more recommended routes 72.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle monitoring system comprising:
   a location-determining device;
   a communication device; and
   a processor programmed to transmit a plurality of locations as determined by the location-determining device over the communication device, the processor programmed to receive a user selection of locations not to transmit over the communication device, the processor programmed not to transmit the user selection of locations over the communication device.

2. The vehicle monitoring system of claim 1 wherein the user selection of locations is based upon time of day.

3. The vehicle monitoring system of claim 1 wherein the processor monitors driver data indicative of driver behavior and transmits the driver data via the communication device, and wherein the processor transmits the driver data even when the processor does not transmit location.

4. The vehicle monitoring system of claim 1 wherein the user selection of locations is a selected geographic area.

5. The vehicle monitoring system of claim 1 wherein the user selection of locations is based upon day of the week.

6. A method for monitoring a vehicle including the steps of:
   a) monitoring locations of a vehicle over time;
   b) a processor receiving a user selection of criteria for which the locations should not be reported, wherein the user selection of criteria includes a geographic area; and
   c) the processor transmitting locations monitored in step a) via a communication device, excluding locations meeting the criteria.

7. The method of claim 6 further including the steps of:
   the processor monitoring data indicative of driving behavior; and
   transmitting data indicative of driving behavior including driving behavior meeting the criteria.

8. The method of claim 6 wherein the criteria includes time of day.

9. The method of claim 6 wherein the criteria includes day of the week.

10. The vehicle monitoring system of claim 1 wherein the processor monitors distance driven and transmits the distance driven via the communication device, and wherein the processor transmits the distance driven even when the processor does not transmit location.

11. The vehicle monitoring system of claim 1 wherein the processor monitors speed and transmits the speed via the communication device, and wherein the processor transmits the speed even when the processor does not transmit location.

12. The vehicle monitoring system of claim 1 further including a profile associated with the user, the profile storing the user selection of locations, the processor programmed to receive the user selection of locations from the profile.

13. The vehicle monitoring system of claim 12 wherein the profile is stored on a server accessible by the user over a wide area network such that the user can modify the user selections of locations in the profile over the wide area network.

14. The method of claim 6 further including the steps of:
   the processor monitoring data indicative of distance driven; and
   transmitting data indicative of distance driven including distance driven during times when the criteria are met.

15. The method of claim 6 further including the steps of:
   the processor monitoring data indicative of speed; and
   transmitting data indicative of speed including speed during times when the criteria are met.

\* \* \* \* \*